(12) United States Patent
Jones et al.

(10) Patent No.: US 7,965,614 B2
(45) Date of Patent: Jun. 21, 2011

(54) WEAR RESISTANT DATA STORAGE DEVICE

(75) Inventors: Paul Max Jones, Pittsburgh, PA (US);
Corina Nistorica, San Jose, CA (US);
Yiao-Tee Hsia, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1114 days.

(21) Appl. No.: 11/701,264

(22) Filed: Feb. 1, 2007

(65) Prior Publication Data
US 2008/0187780 A1 Aug. 7, 2008

(51) Int. Cl.
*G11B 9/00* (2006.01)
(52) U.S. Cl. ........................................ 369/126
(58) Field of Classification Search .................. 369/126, 369/100; 365/151
See application file for complete search history.

(56) References Cited

U.S. PATENT DOCUMENTS

| | | | | |
|---|---|---|---|---|
| 5,730,940 | A * | 3/1998 | Nakagawa | 422/68.1 |
| 5,992,226 | A * | 11/1999 | Green et al. | 73/105 |
| 6,353,221 | B1 * | 3/2002 | Elings | 250/307 |
| 6,844,144 | B2 | 1/2005 | Krause et al. | |
| 7,057,997 | B2 | 6/2006 | Birecki et al. | |
| 2002/0086319 | A1 * | 7/2002 | Ellson et al. | 435/6 |
| 2004/0113641 | A1 | 6/2004 | Birecki et al. | |
| 2004/0217345 | A1 * | 11/2004 | Boland et al. | 257/40 |
| 2006/0100787 | A1 * | 5/2006 | Berlin et al. | 702/19 |

OTHER PUBLICATIONS

S. Timuss et al., "Effect of end-group sticking energy on the properties of polymer brushes: Comparing experiment and theory", Journal Of Chemical Physics, vol. 121, No. 22, Dec. 8, 2004, pp. 11408-11419.
T. Kreer et al., "Friction between Polymer Brushes in Good Solvent Conditions: Steady-State Sliding versus Transient Behavior", Langmuir, vol. 19, No. 18, 2003 , pp. 7551-7559.
"Conductive Polymer", at http://en.wikipedia.org/wiki/Conductive polymer (downloaded on Aug. 31, 2010).

* cited by examiner

*Primary Examiner* — Thang V Tran
(74) *Attorney, Agent, or Firm* — Robert P. Lenart, Esq.; Pietragallo Gordon Alfano Bosick & Raspanti, LLP

(57) ABSTRACT

An apparatus including a transducer having a plurality of polymer strands attached thereto and/or a storage media having a plurality of polymer strands attached thereto. When the apparatus includes both the transducer and the storage media, the plurality of polymer strands attached to the transducer may be positioned to interact with the plurality of polymer strands attached to the storage media. The transducer may be a probe for a data storage device. The storage media may be a ferroelectric storage media.

17 Claims, 2 Drawing Sheets polypyrrole polyaniline polythiophene

Polyphenylene vinylene

WEAR RESISTANT DATA STORAGE DEVICE

FIELD OF THE INVENTION

The invention relates generally to data storage devices and, more particularly, to a data storage device with improved wear resistance.

BACKGROUND INFORMATION

Data storage devices are continuously being proposed to provide smaller size, higher capacity, and lower cost data storage devices. One such type of data storage device is a probe storage device that may include, for example, one or more probes that each includes a conductive element (e.g. an electrode), which are positioned adjacent to and in contact with a ferroelectric thin film media. Binary "1's" and "0's" are stored in the media by causing the polarization of the ferroelectric film to point "up" or "down" in a spatially small region (e.g. a domain) local to a tip of the probe by applying suitable voltages to the probe through the conductive element. Data can then be read by a variety of techniques including sensing of piezoelectric surface displacement, measurement of local conductivity changes, or by sensing current flow during polarization reversal.

A ferroelectric media typically includes a protective overcoat to minimize wear and limit contamination of the media. The probe may also include a protective overcoat to minimize wear of the probe. The probe and media protective overcoat thicknesses along with lubricant film thickness applied to the media protective overcoat combine to contribute to a large portion of the total head-to-media spacing budget. This spacing in turn affects the writing voltage efficiency, the readback efficiency, and the physical dimensions of the data written to the ferroelectric media. Thus, eliminating or reducing the need for the protective overcoats may improve the efficiencies and dimensions of the data storage system.

Accordingly, there is identified a need for improved data storage devices that overcome limitations, disadvantages and shortcomings of known data storage devices.

SUMMARY OF THE INVENTION

The invention meets the identified need, as well as other needs, as will be more fully understood following a review of this specification and drawings.

An aspect of the present invention is to provide an apparatus including a transducer and a plurality of polymer strands attached to the transducer. The transducer may be a probe for a data storage device. The polymer strands may be formed of a conductive polymer. In addition, the polymer strands may be formed of, for example, polypyrrole, polyaniline, polythiophene, or polyphenylene vinylene.

Another aspect of the present invention is to provide an apparatus including a storage media and a plurality of polymer strands attached to the storage media. The storage media may be a ferroelectric storage media. The polymer strands may be formed of a conductive polymer. In addition, the polymer strands may be formed of, for example, polypyrrole, polyaniline, polythiophene, or polyphenylene vinylene.

A further aspect of the present invention is to provide an apparatus including a transducer having a plurality of polymer strands attached thereto and a storage media having a plurality of polymer strands attached thereto. The plurality of polymer strands attached to the storage media are positioned to interact with the plurality of polymer strands attached to the transducer. The transducer may be a probe for a data storage device. The storage media may be a ferroelectric storage media. In addition, the transducer and the storage media may be submerged or contained in a defined environment, such as, for example, a solvent, water, or vapor phase environment enriched with a solvent or water.

These and other aspects of the present invention will be more apparent from the following description.

DETAILED DESCRIPTION

Figure 1:
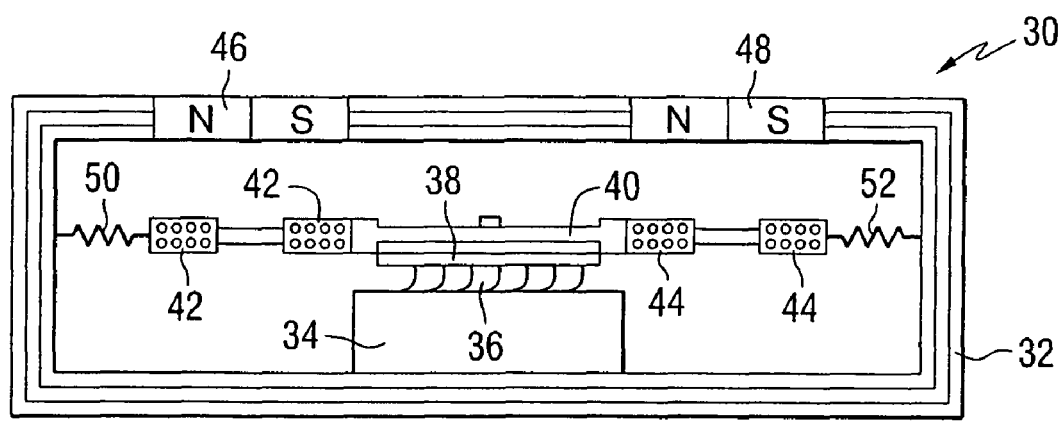
FIG. 1 is a schematic cross-sectional view of a data storage device that may incorporate the present invention.

FIG. 1 is a schematic cross-sectional view of a data storage device 30 constructed in accordance with the invention. The device 30 includes an enclosure 32 that contains a substrate 34. An array of transducers, such as, for example, probes 36 is positioned on the substrate 34. The probes 36 extend upward to make contact with a storage media, such as, for example, a ferroelectric storage media 38. The storage media 38 is mounted on a movable member 40. Coils 42 and 44 are mounted on the movable member 40. Magnets 46 and 48 are mounted in the enclosure 32 near the coils 42 and 44, respectively. Springs 50 and 52 form part of a suspension assembly that supports the movable member 40. It will be appreciated that the combination of coils 42 and 44 and magnets 46 and 48 forms an actuator assembly that is used to move the movable member 40. Electric current in the coils 42 and 44 creates a magnetic field that interacts with the magnetic field produced by the magnets 46 and 48 to produce a force that has a component in the plane of the movable member 40 and causes linear movement of the movable member 40. This movement in turn causes individual storage locations or domains on the media 38 to be moved relative to the probes 36.

While FIG. 1 shows one aspect of a data storage device 30, the invention is not limited to any particular configuration of data storage device or associated components. For example, the probes 36 can be arranged in various configurations relative to the media 38, or the probes 36 could be positioned above the media 38. In addition, other types of actuator assemblies, such as, for example, electrostatic actuators, can provide the relative movement between the probes 36 and the media 38.

Figure 2:
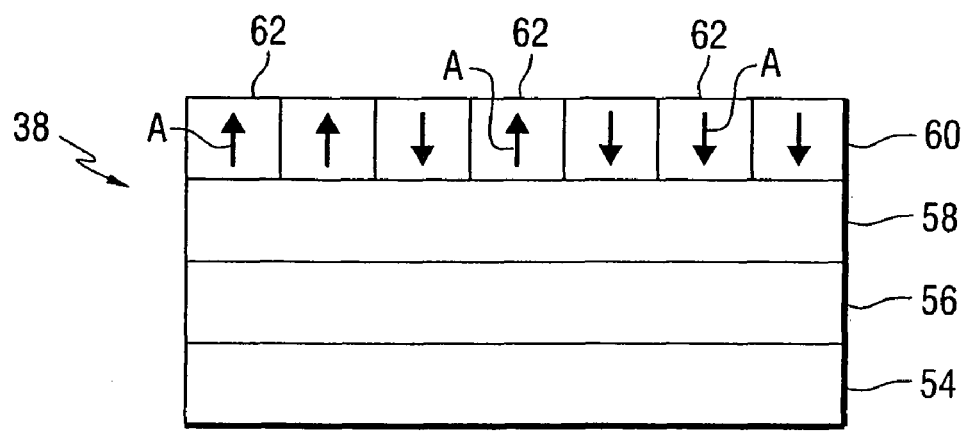
FIG. 2 is a detailed side view of a storage media that can be used in accordance with the invention.

FIG. 2 is a more detailed side view of the ferroelectric storage media 38 that can be used in accordance with the invention. The storage media 38 includes a substrate 54, which can be for example Si. The media 38 may also include an intermediate or seed layer 56, which can be for example $SrTiO_3$, positioned adjacent to the substrate 54. The media 38 may also include an additional intermediate or seed layer 58, which can be for example $SrRuO_3$, positioned adjacent to the layer 56. The media 38 also includes a ferroelectric storage layer 60, which can be for example lead zirconium titanate (PZT), positioned adjacent to the layer 58. However, it will be appreciated that other intermediate or seed layers may be used between the substrate 54 and the storage layer 60. While specific example materials are described herein, it should be understood that this invention is not limited to the example materials.

Still referring to FIG. 2, the ferroelectric storage layer 60 includes a plurality of individual domains 62 that have designated polarizations, as indicated by arrows A, that represent the data being stored in each domain 62.

Figure 3:
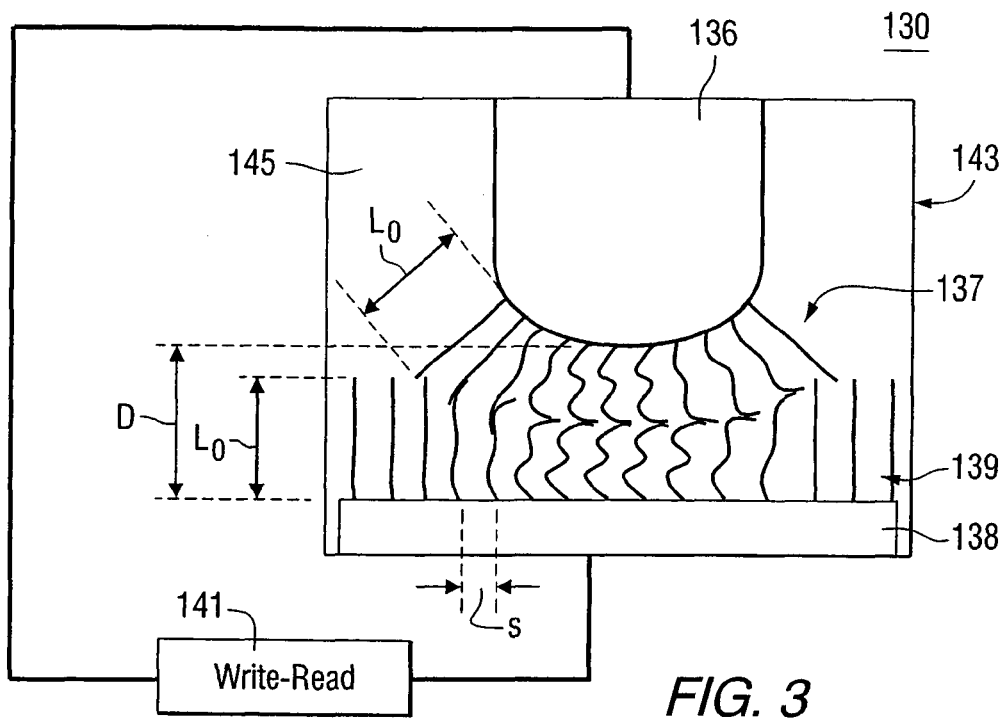
FIG. 3 is a schematic illustration of a data storage device constructed in accordance with the invention.
Figure 4A:
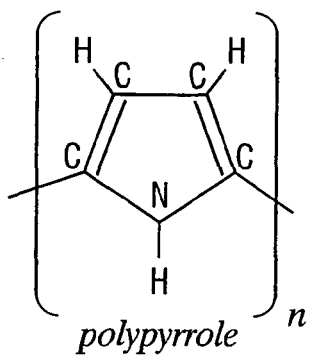
FIGS. 4a-4d illustrate examples of polymers for use with the present invention.
Figure 4B:
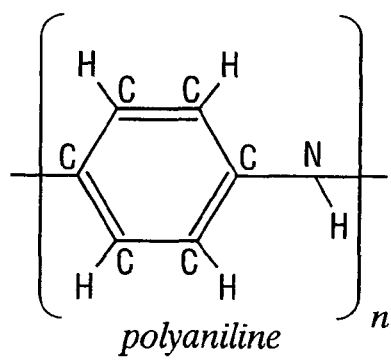
Figure 4C:
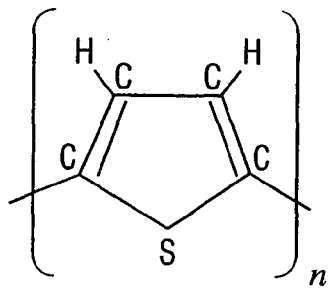
Figure 4D:
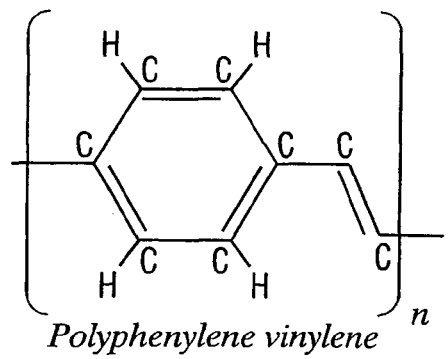

Referring to FIG. 3, there is set forth a schematic illustration of a data storage device 130 constructed in accordance with the invention. The device 130 includes a transducer, such as, for example, probe 136 positioned adjacent to a storage media such as, for example, a ferroelectric storage media 138. It will be appreciated that only a single probe 136, i.e. transducer, is shown in FIG. 3 for simplification of description of the invention, but that a plurality of probes may be provided. The probe 136 includes a plurality of conductive polymer strands 137 attached thereto. In addition, the media 138 includes a plurality of conductive polymer strands 139 attached thereto. The strands 137 and 139 are positioned for interaction therebetween. As the media 138 is moved relative to the probe 136 to perform write-read operations as controlled by a write-read circuit 141, the strands 137 and 139 interact to reduce friction between the probe 136 and the media 138 and, therefore, reduce wear of these components. Advantageously, this extends the life cycles of both the probe 136 and the media 138 which would otherwise be in direct contact with each other and subject to a significant wear rate without the presence of the strands 137 and 139.

Still referring to FIG. 3, the data storage device 130 may be contained within a defined environment 143 such as, for example, immersing the probe 136 and the media 138 in a solvent 145. This provides for an osmotic pressure to be built up between the strands 137 attached to the probe 136 and the strands 139 attached to the media 138 so as to maintain the probe 136 and the media 138 at a fixed separation distance D (see FIG. 3), where D may be in the range of about 1 nm to about 10 nm. Examples of a solvent 145 suitable for use with the invention include toluene or cyclohexane.

Once immersed in a chosen solvent 145 or other defined environment, the polymer strands 137 and 139 length, $L_0$, responds to the approach of the probe 136 to the media 138 with a repulsive pressure, P, that is a function of the gap, D, between the probe 136 and the media 138 in accordance with the following equation:

$$P \propto \left(\frac{L_0}{D}\right)^{\frac{5}{4}}$$

Thus, the outer regions of the polymer strands 137 and 139 are allowed to touch and, therefore, minimize the friction between the probe 136 and the media 138 as these components move relative to one another during write-read operations. The length $L_0$ may be in the range of about 1.0 nm to about 100 nm and represents an average, substantially uncompressed length for the polymer strands 137 and 139. It will be appreciated that $L_0$ in FIG. 3 illustrates an example where $L_0$ is less than D, but that $L_0$ can be greater than D.

In addition to the described solvents, other defined environments 143 may be utilized in accordance with the invention. For example, the defined environment 143 could be air, water or other suitable liquids that facilitate the desired interaction between the polymer strands 137 and 139. As another example, the defined environment 143 could be a vapor phase environment enriched with a predetermined solvent, water, or other suitable liquid.

FIGS. 4a-4d illustrate examples of suitable polymers for forming the polymer strands 137 and 139. In selecting a particular polymer, an important aspect of a data storage device is the necessity for the close proximity of the writing instrument, i.e. the probe 136, to the storage media 138. This spacing should not be unnecessarily increased by the presence of a lubricating body. Thus, the polymer strands 137 and 139 should not increase the spacing between the probe 136 and the media 138. In order to maintain a suitable spacing between the probe 136 and the media 138, the present invention utilizes a conducting polymer to form the strands 137 and 139 so as to maintain sufficient electrical conductivity between the probe 136 and the media 138 while reducing friction and/or wear between these components.

The polymer strands 137 and 139 may be attached to the surfaces of the probe 136 and media 138, respectively, using techniques such as, for example, grafting or chemical anchoring. When attaching the polymer strands 137 and 139 to the probe 136 and media 138, respectively, by a particular technique described herein, an important consideration is the density of strands to be attached. The spacing, s, (see FIG. 3) between grafted strands 137 or 139 is an important parameter in determining density and may be determined from the following equation:

$$s^2 \approx a^2 \left[\frac{N}{\Delta}\right]^{\frac{6}{5}}$$

wherein:
s=spacing between polymer strands;
a=polymer segment length;
N=degree of polymerization or polymer chain length;
Δ=sticking energy of the polymer strand.
Thus, the more highly bound the polymer is to the probe 136 and media 138, the closer packed the strands are to one another. In accordance with the invention, the spacing, s, may be in the range of about 2 nm to about 60 nm.

Whereas particular aspects have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims. For example, the invention has been described herein and illustrated in the context of a probe storage device, but it will be appreciated that the invention may be utilized with, for example, other data storage devices and components thereof where the use of polymer strands may be advantageous in, for example, reducing friction and wear, or enhancing electrical conductivity between components.

What is claimed is:
1. An apparatus, comprising:
   a transducer;
   a first plurality of intrinsically conductive polymer strands attached to the transducer;
   a continuous storage media; and
   a second plurality of intrinsically conductive polymer strands attached to the storage media.
2. The apparatus of claim 1, wherein the transducer is a probe.
3. The apparatus of claim 1, wherein said first plurality of polymer strands are formed of polypyrrole, polyaniline, polythiophene, or polyphenylene vinylene.
4. The apparatus of claim 1, wherein the continuous storage media is a ferroelectric storage media including a plurality of domains having polarizations representative of data.

5. The apparatus of claim 1, wherein said second plurality of polymer strands are formed of polypyrrole, polyaniline, polythiophene, or polyphenylene vinylene.

6. The apparatus of claim 1, wherein said transducer and said storage media are contained in a defined environment.

7. The apparatus of claim 1, wherein the spacing between said polymer strands attached to said transducer and the spacing between said polymer strands attached to said storage media is in the range of about 2 nm to about 60 nm.

8. The apparatus of claim 1, wherein the plurality of polymer strands attached to said storage media are positioned to interact with the plurality of polymer strands attached to said transducer.

9. The apparatus of claim 1, wherein said polymer strands attached to said transducer and said polymer strands attached to said storage media each have a length in the range of about 1.0 nm to about 100 ml.

10. The apparatus of claim 1, wherein said transducer and said storage media are spaced apart a distance in the range of about 1 nm to about 10 nm.

11. The apparatus of claim 1, wherein the transducer is a read/write magnetic recording head.

12. An apparatus, comprising:
a transducer having a plurality of polymer strands attached thereto; and
a storage media positioned adjacent to said transducer, said storage media having a plurality of polymer strands attached thereto, wherein the transducer and said storage media are contained in a defined environment and wherein said defined environment includes a solvent, water, or vapor phase environment wherein the vapor phase is enriched with a solvent or water.

13. The apparatus of claim 12, wherein the solvent includes toluene or cyclohexane.

14. The apparatus of claim 12, wherein the spacing between said polymer strands attached to said transducer and the spacing between said polymer strands attached to said storage media is in the range of about 2 nm to about 60 nm.

15. The apparatus of claim 12, wherein the plurality of polymer strands attached to said storage media are positioned to interact with the plurality of polymer strands attached to said transducer.

16. The apparatus of claim 12, wherein said polymer strands attached to said transducer and said polymer strands attached to said storage media each have a length in the range of about 1.0 nm to about 100 nm.

17. The apparatus of claim 12, wherein said transducer and said storage media are spaced apart a distance in the range of about 1 nm to about 10 nm.

* * * * *